United States Patent [19]
Wagner

[11] Patent Number: 5,085,361
[45] Date of Patent: Feb. 4, 1992

[54] BURGLAR BAR BREAKING TOOL

[76] Inventor: Barry K. Wagner, 10521 Hermanos, San Diego, Calif. 92124

[21] Appl. No.: 556,288

[22] Filed: Jul. 23, 1990

[51] Int. Cl.5 ............................................. B26F 3/00
[52] U.S. Cl. ...................................... 225/102; 29/240; 29/267; 29/283.005; 225/93
[58] Field of Search ............................ 225/1, 93, 102; 81/177.2; 29/425.4, 425.5, 425.6, 267, 278, 283.5, 240; 7/166, 167, 168, 169, 170

[56] References Cited

U.S. PATENT DOCUMENTS

| | | | |
|---|---|---|---|
| 37,920 | 3/1863 | Penny | 7/169 |
| 441,979 | 12/1890 | Rohrbach et al. | 7/166 |
| 510,981 | 12/1893 | Massey | 81/177.2 |
| 896,512 | 8/1908 | Blauch | 7/166 |
| 913,013 | 2/1909 | Jensen | 225/102 |
| 2,486,022 | 10/1949 | Haist et al. | 7/166 |
| 2,733,736 | 2/1956 | McLaughlin | 225/102 |
| 3,619,887 | 11/1971 | McLaughlin | 29/207 |
| 3,834,749 | 9/1974 | Phelps | 294/15 |
| 3,913,423 | 10/1975 | Gerst | 81/3 |
| 4,293,993 | 10/1981 | Baker | 29/278 |
| 4,490,088 | 12/1984 | Castle | 414/457 |
| 4,620,462 | 11/1986 | Parker | 81/177.5 |

Primary Examiner—Hien H. Phan
Attorney, Agent, or Firm—Brown, Martin Haller & McClain

[57] ABSTRACT

A burglar bar breaking tool comprises a solid block or tool head of relatively heavy metal having at least one slot extending lengthwise along part of its peripheral edge for receiving the end of a prying tool, and a recess extending inwardly from the peripheral edge of the block for engagement transversely over a burglar bar so that a prying tool or handle shaft engaged in the slot can be used to apply twisting force to the burglar bar. In one embodiment, the block periphery is four-sided and has sleeves welded to each of its four sides each defining a slot for receiving a prying tool. In another embodiment, the tool head is permanently secured to one end of a handle shaft.

14 Claims, 3 Drawing Sheets

BURGLAR BAR BREAKING TOOL

BACKGROUND OF THE INVENTION

1. Field of the Invention

The present invention relates generally to tools for forcible entry of buildings in the case of an emergency, and is particularly concerned with a tool for breaking or tearing loose a burglar bar forming part of a grille or security frame covering a door or window to allow entry of a building by emergency personnel such as firemen.

2. Description of Related Art

Security conscious individuals these days often install security grilles or gratings of metal bars covering the access openings to their homes, such as doors and windows, to make it more difficult for burglars to break into their home. The bars of such gratings are known as burglar bars. The presence of security gratings can make it extremely difficult for emergency Personnel such as firemen to enter a building in an emergency such as a fire, increasing the risk of substantial damage as well as injury or loss of life to the occupants of a home protected from burglars in this way. Typically, fire departments have only one fire truck with power tools for every six fire engines with water pumps. If the fire-truck is out at a remote location, no power tools for breaking burglar bars will be immediately available. Thus, there may be a significant time delay before emergency personnel can gain access to a building since only conventional manual tools are carried on fire engines, which cannot break burglar bars.

SUMMARY OF THE INVENTION

It is an object of this invention to provide a new and improved manual tool for breaking burglar bars quickly and easily to allow access to buildings by emergency personnel.

According to one aspect of the present invention, a burglar bar breaking tool for breaking or tearing loose bars of the frame of a security grating is provided, which comprises a solid metal block having at least one slot extending lengthwise or edgewise along part of the periphery of the block for engagement by a prying tool, the block having a recess extending inwardly from its periphery for engagement transversely over a burglar bar to allow torque or twisting force to be applied to the bar via a prying a tool or pry bar inserted in the slot, the recess having a width slightly greater than that of a burglar bar.

Preferably, a series of spaced, prying tool receiving slots are arranged end to end at spaced intervals around the peripheral edge of the block. This allows a prying tool to be first inserted in the most accessible, uppermost slot after engagement of the tool over a burglar bar, then turned as far as possible, after which it is removed and inserted in the next slot, repeating the same procedure until the bar is twisted so far that it either breaks or pulls away from the surrounding wall on which it is mounted.

In a preferred embodiment of the invention, the block is of generally rectangular periphery with a pry bar slot on each of the side edges of its periphery. The slots preferably comprise through bores in sleeve members welded on to each of its side edges, and the recess extends inwardly from one corner towards the center of the block. A releasable bolt or the like may be provided for extending across the open end of the recess to retain the block on the burglar bar and to reduce the risk of injury as a result of the block falling from a burglar bar. The recess may be straight, stepped or tapered with a 1 degree locking taper for fitting over various width burglar bars. The block is of heavy, high density metal such as heat tempered steel.

According to another aspect of the present invention, a burglar bar breaking tool is provided which comprises an elongate handle with a head secured at one end of the handle, the head having a recess of predetermined dimensions for just fitting over a burglar bar, and the handle having a length of at least 29 inches to provide the necessary leverage for breaking a burglar bar. Preferably, the handle extends at an angle to the recess to enable the recess to be engaged over a burglar bar in a relatively small window opening.

The tools with the removable or fixed handles are a compact and convenient addition to a fireman's tools, and will save a significant amount of time in gaining access to buildings protected by security grilles.

BRIEF DESCRIPTION OF THE DRAWINGS

The present invention will be better understood from the following detailed description of some preferred embodiments of the invention, taken in conjunction with the accompanying drawings, in which like reference numerals refer to like parts and in which.

DESCRIPTION OF THE PREFERRED EMBODIMENTS

Figure 1:
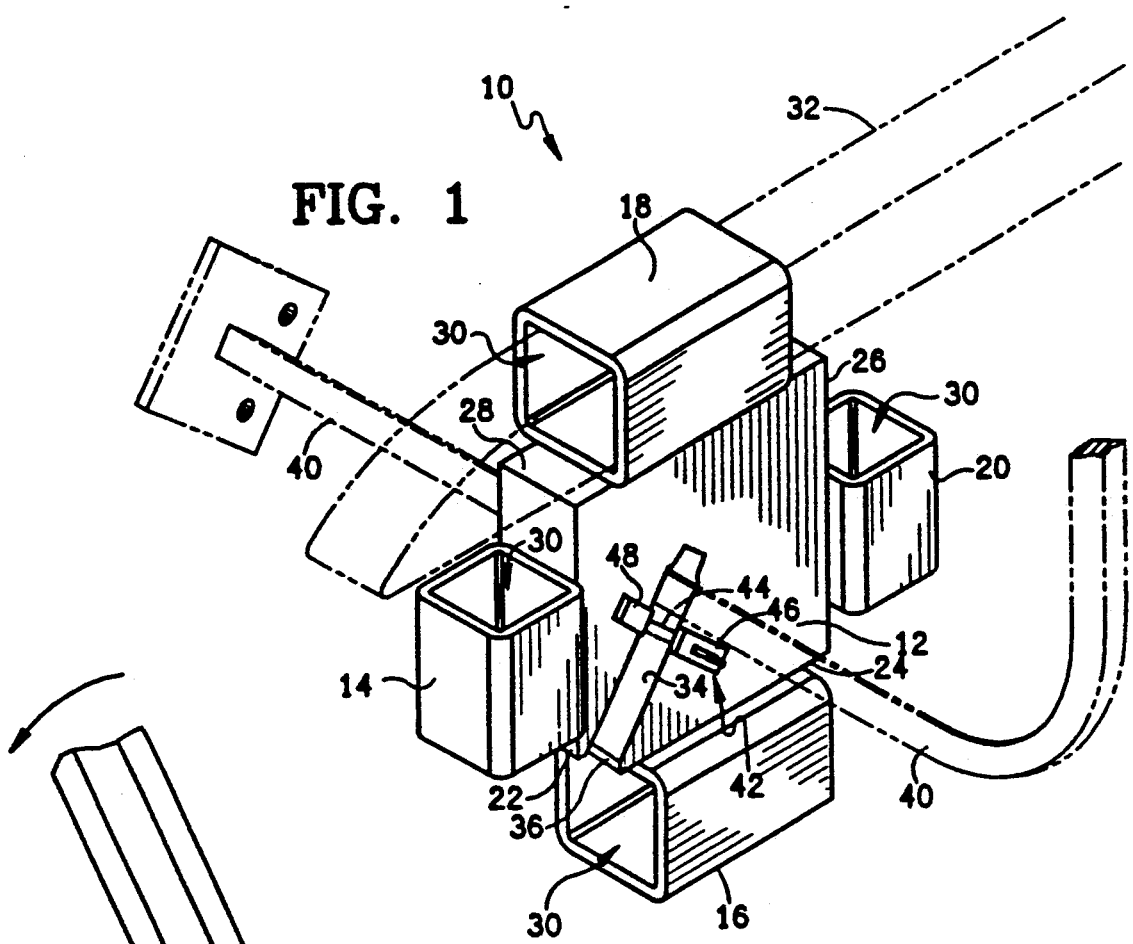
FIG. 1 is a perspective view of a burglar bar breaking tool according to a first embodiment of the invention.
Figure 2:
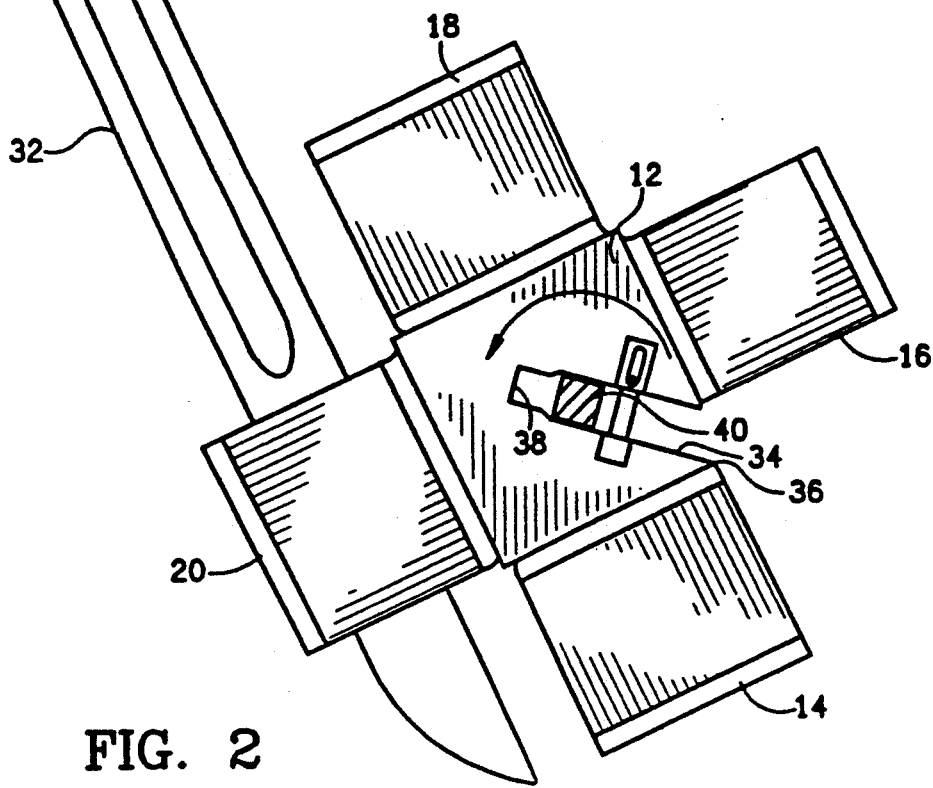
FIG. 2 is a front elevational view illustrating operation of the tool with a fireman's pry bar.

FIGS. 1 and 2 of the drawings illustrate a burglar bar breaking tool 10 according to a first embodiment of the invention. The tool 10 basically comprises a solid block 12 of suitable high strength, heavy metal such as iron or heat tempered steel having a generally square or rectangular periphery, with four channel or sleeve members 14, 16, 18, 20 of the same metal secured by welding or the like to the four sides or edges 22, 24, 26, 28, respectively, of the block. Each of the sleeve members has a through bore or slot 30 of generally square cross section dimensioned to receive the end of a standard fireman's prying tool 32 or pry bar of the type indicated in FIGS. 1 and 2.

Figure 3:
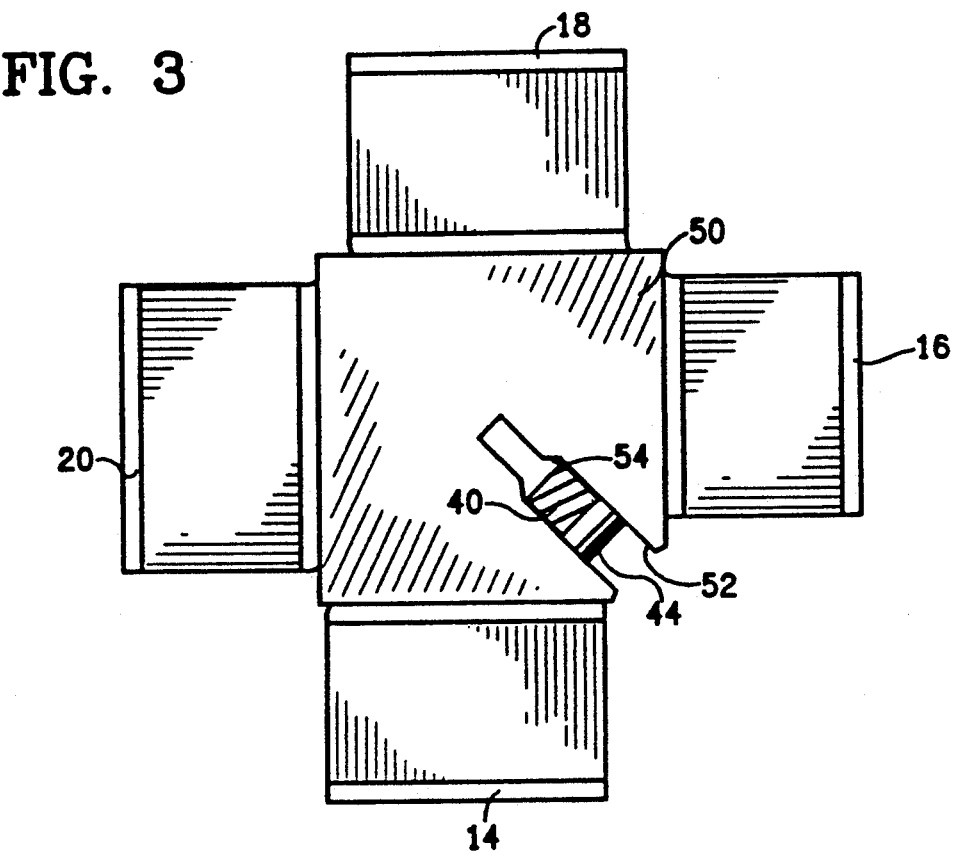
FIG. 3 is a similar view to FIG. 2 illustrating a modified burglar bar engaging recess.
Figure 4:
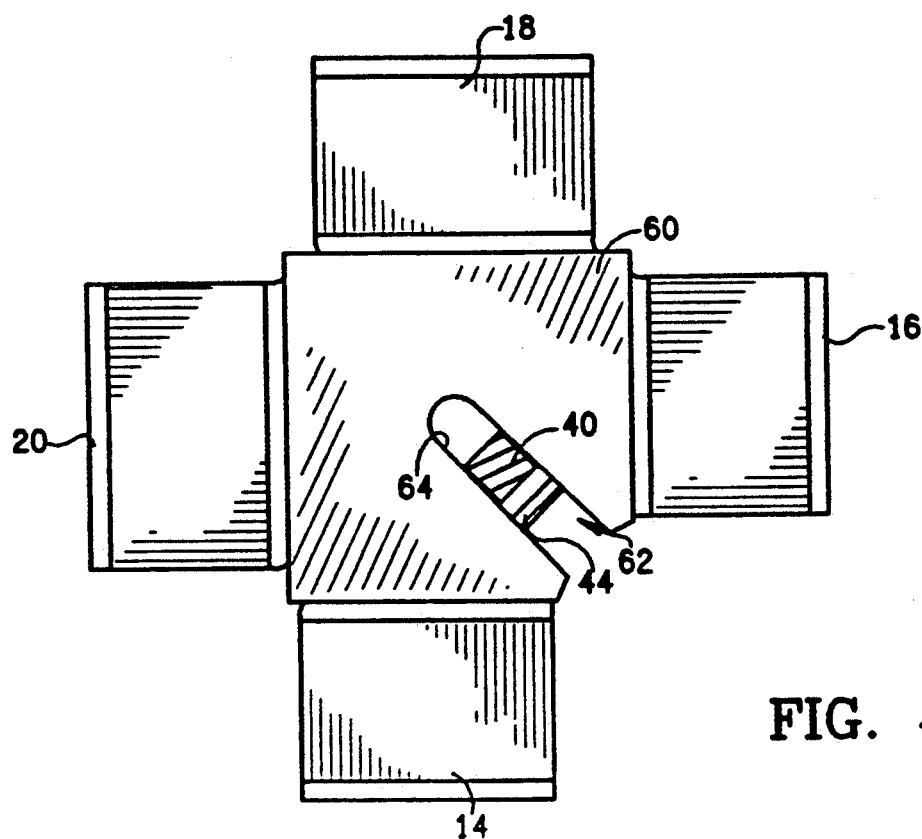
FIG. 4 illustrates another modified burglar bar engaging recess.

A recess 34 extends inwardly from one of the corners 36 of the block towards the center. Preferably, the inner end 38 of the recess 34 is located at or close to the center of the block. The recess is dimensioned for fitting transversely over a burglar bar 40 forming part of a security grille over a window or door, as indicated in FIGS. 1 and 2. The width of the recess is slightly greater than that of a standard burglar bar, so that it just fits over the bar. For example, for a standard, ½ inch burglar bar, the recess will have a width of 0.5010 to 0.5015 inches. In the embodiment illustrated in FIGS. 1 and 2, the recess is a parallel sided, straight slot. Some alternative recess shapes are illustrated in FIGS. 3 and 4 to allow for varying burglar bar widths or thickness. In FIG. 3, block 50 has a recess 52 with a step 54 separating different width recess portions for fitting over different size burglar bars. In FIG. 4, the block 60 has a recess 62 with tapered sides 64 defining a slot of gradually reducing width which will fit over a range of slightly different thickness burglar bars. The recess 62 has a 1 degree locking taper and tapers in width by about 0.0005 inches between its ends. Thus, when forced over a burglar bar it will "lock" onto the parallel sides of the bar while torque is applied via a suitable prying tool. Apart from the different shape recesses 52 and 62 in FIGS. 3 and 4, the tools illustrated are otherwise the same as that illustrated in FIGS. 1 and 2 and will be used in an equivalent fashion.

A releasable bolting or latching device 42 is mounted on one face of the block 12 to extend transversely across that side of the recess when extended as indicated in dotted outline in FIG. 1. Any suitable bolt device may be used. In the illustrated example, a bolt member 44 is slidably mounted in one end support 46 mounted on one side of the recess, and is moveable between the retracted position illustrated in FIG. 1 into the extended dotted line position in which it engages in a suitable recess or slot in a second, opposing end support 48 mounted on the opposite side of the recess.

Recess 34 is preferably at a 45 degree angle to the sides of the block. The dimensions and material of the block are selected to provide the required strength for prying loose or breaking a burglar bar, but at the same time to be sufficiently compact for easy transportation and use. In one specific example, a block of heavy, high density heat tempered steel having a square periphery and dimensions 2.5 inches by 2.5 inches by 1 inch was used, having a recess extending from one corner at an angle of 45 degrees, the length of the recess being about 1.5 inches and the width being around ½ inch.

In order to use the tool 10 to break or pry loose a burglar bar, the recess is first engaged transversely over a burglar bar at a location near an anchored end of the bar. Due to the recess dimensions, the recess is a close fit over the burglar bar. The bolt is then extended to prevent the tool from slipping off the bar, and a pry bar or prying tool is inserted in the appropriate, accessible sleeve, for example sleeve 14 as illustrated in FIG. 1. Force is then applied to the pry bar in the direction of the arrow in FIG. 2, applying torque or twisting force to the burglar bar. After approximately one quarter turn, the pry-bar is removed from its slot and inserted in the next accessible sleeve, 20 (see FIG. 2) before turning again through one quarter of a complete rotation. This procedure can be repeated until the burglar bar either breaks or is torn away from its mounting point on the adjacent wall.

Figure 5:
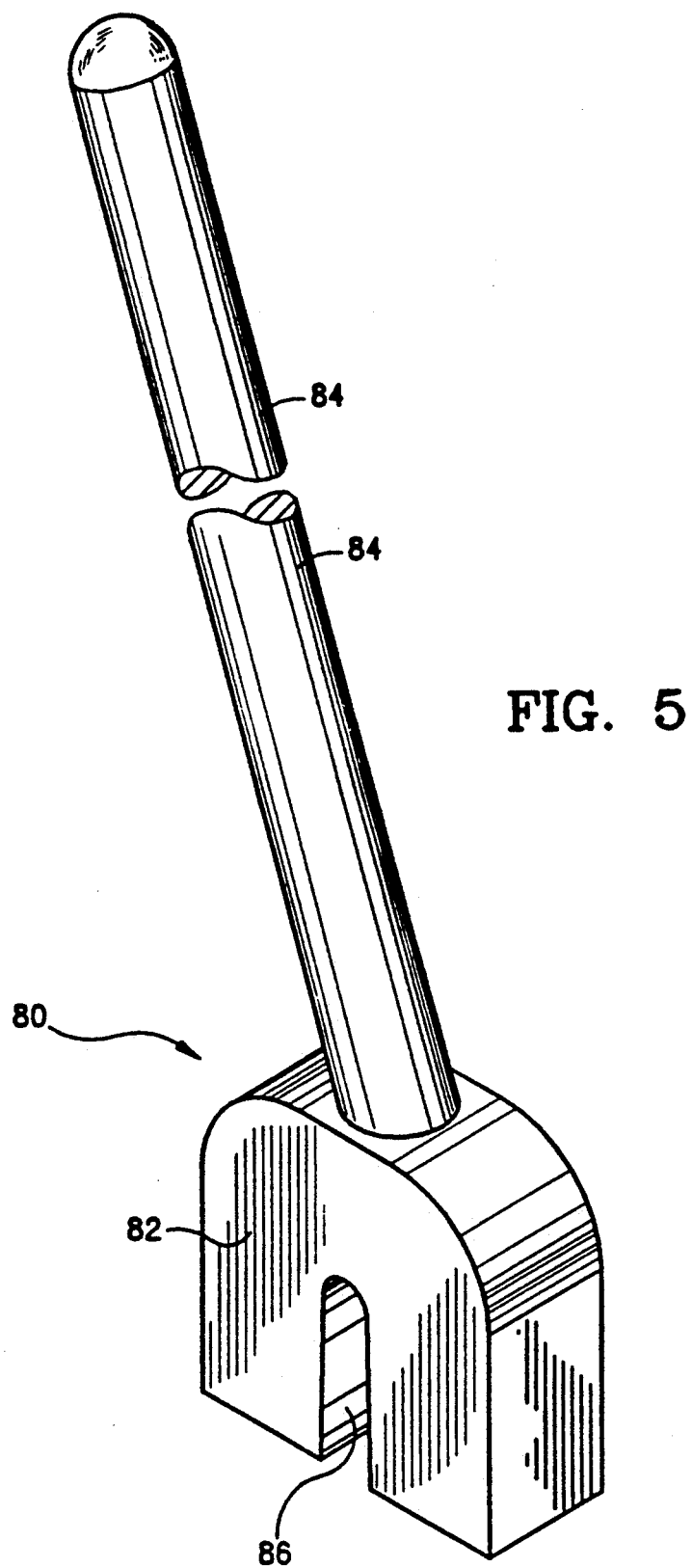
FIG. 5 illustrates a burglar bar breaking tool according to another embodiment of the invention.

FIG. 5 of the drawings illustrates a burglar bar breaking tool 80 according to another embodiment of the invention. Tool 80 has a head 82 from which an elongate handle shaft 84 extends. A suitably dimensioned, elongate recess 86 is provided in the head 82 for fitting transversely over a burglar bar in a similar manner to recess 34 in the tool of the first embodiment.

The handle shaft preferably extends at an angle of at least 15 to 20 degrees to the axis of recess 34. This offset in the handle shaft will enable the head 82 to be positioned on a burglar bar in a relatively small window opening without the upper end of the bar striking the upper bar support. The handle itself must be relatively long to enable sufficient leverage to be applied to break the burglar bar. Preferably, the handle shaft is at least 29 inches in length.

The width of the recess 86 is also critical to ensure that it will "lock" onto the burglar bar and will not slip when leverage or twisting force is applied via the handle. Most standard burglar bars are of ½ inch width or thickness, and the width of recess 86 will be between 0.5010 to 0.5015 inches in this case. Alternatively, a recess of stepped diameter or a recess with a 1 degree locking taper may be provided, as in FIGS. 3 and 4.

The tool with the fixed handle may be more convenient since it does not require an additional, separate prying tool or handle. However, the tool with handle slots or openings as in the first embodiment may be preferred in some cases since it will take up less space.

The tool in each embodiment is quick and easy to use and can considerably reduce the time required for emergency personnel to enter a building protected by security grilles. It can be easily added to a fireman's standard tool kit for use either alone or with the standard pry bar. When a fire breaks out, it can be a matter of life or death for fireman to enter a building quickly, and this tool can considerably expedite the process in buildings having access openings covered by burglar bar grilles, where power tools for breaking the bars are not immediately available.

Although some preferred embodiments of the invention have been described above by way of example only, it will be understood by those skilled in the field that modifications may be made to the disclosed embodiment without departing from the scope of the invention, which is defined by the appended claims.

I claim:

1. A burglar bar breaking tool, comprising:
   a solid block of metallic material having an outer peripheral edge and a series of slots for selectively receiving the end of a prying tool arranged end to end at spaced intervals around the peripheral edge of the block; and
   the block having a recess extending inwardly from the peripheral edge for engaging transversely over a burglar bar to allow torque to be applied to the burglar bar via a prying tool inserted in a selected slot.

2. The tool as claimed in claim 1, wherein the block has a rectangular peripheral edge, and a series of sleeve members are secured around the edge of the block, one sleeve member being secured along at least part of each side edge of the periphery, said sleeve members having through bores comprising slots for receiving a prying tool.

3. The tool as claimed in claim 1, including releasable bolting means for extending transversely across the width of said recess for holding said tool on a burglar bar.

4. The tool as claimed in claim 1, wherein said recess has straight, parallel sides.

5. The tool as claimed in claim 4, wherein the recess width is between 0.5010 and 0.5015 inches.

6. The tool as claimed in claim 1, wherein said recess has stepped sides forming varying width portions of the recess.

7. The tool as claimed in claim 1, wherein said recess has tapered sides tapering inwardly from its outer end towards its innermost end.

8. The tool as claimed in claim 1, wherein said block is of heavy, high density metal.

9. The tool as claimed in claim 8, wherein the metal is heat tempered steel.

10. A burglar bar breaking tool, comprising
a solid block of metallic material having a rectangular peripheral edge and at least one slot extending lengthwise along part of the length of the peripheral edge comprising means for receiving the end of a prying tool; and
the block having a recess extending inwardly at an angle of 45 degrees from one corner of the block for engaging transversely over a burglar bar to allow torque to be applied to the burglar bar via a prying tool inserted in the slot.

11. The tool as claimed in claim 10, wherein the recess extends to the center of the block.

12. The burglar bar breaking tool, comprising:
a solid block of metallic material having a rectangular peripheral edge and at least one slot extending lengthwise along part of the length of the peripheral edge comprising means for receiving the end of a prying tool;
the block having a recess extending inwardly from the peripheral edge for engaging transversely over a burglar bar to allow torque to be applied to the burglar bar via a prying tool inserted in the slot;
the recess having tapered sides tapering inwardly from its outer ends towards its innermost end; and
the recess having a 1 degree locking taper.

13. A burglar bar breaking tool, comprising:
a solid block of metallic material having a rectangular outer peripheral edge and at least one slot extending along part of the length of the edge for receiving the end of a prying tool;
the block having a recess extending inwardly from the peripheral edge for engaging transversely over a burglar bar to allow torque to be applied to the bar via a prying tool inserted in the slot; and
retaining means for releasably retaining a burglar bar in said recess.

14. The tool as recited in claim 13, wherein said retaining means comprises a releasable retaining member moveable between a retracted position and an extended position extending transversely across the width of said recess for holding said tool on a burglar bar.

* * * * *